US012002633B2

(12) United States Patent
Fujihara et al.

(10) Patent No.: US 12,002,633 B2
(45) Date of Patent: Jun. 4, 2024

(54) SWITCH

(71) Applicant: OMRON Corporation, Kyoto (JP)

(72) Inventors: Takumi Fujihara, Kyoto (JP); Ryoji Shimizu, Kyoto (JP); Kohei Fujio, Kyoto (JP); Akihiro Ishii, Kyoto (JP); Taiki Koyama, Kyoto (JP); Kazushi Maeta, Kyoto (JP); Yohei Tsukanaka, Kyoto (JP); Kohei Sugiyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/752,893

(22) Filed: May 25, 2022

(65) Prior Publication Data

US 2023/0005677 A1 Jan. 5, 2023

(30) Foreign Application Priority Data

Jun. 30, 2021 (JP) ................................. 2021-108913

(51) Int. Cl.
*H01H 13/14* (2006.01)
*H01H 13/10* (2006.01)
(Continued)

(52) U.S. Cl.
CPC ............ *H01H 13/14* (2013.01); *H01H 13/10* (2013.01); *H01H 13/20* (2013.01); *H01H 21/22* (2013.01); *H01H 2231/048* (2013.01)

(58) Field of Classification Search
CPC .. H01H 36/0073; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

2007/0219409 A1* 9/2007 Shimizu ................. A61B 1/045 600/101
2011/0109411 A1* 5/2011 Lee .................... H01H 36/0073 335/207

(Continued)

FOREIGN PATENT DOCUMENTS

JP 2020-4645 A 1/2020

*Primary Examiner* — Ahmed M Saeed
(74) *Attorney, Agent, or Firm* — METROLEX IP LAW GROUP, PLLC

(57) ABSTRACT

A switch according to one or more embodiments may include a movable unit movable in response to an operation. A drive unit is drivable in response to movement of the movable unit. The switch may include an operation-linked unit movable in response to the movement of the movable unit and an operation follower unit spaced from the operation-linked unit to move in response to movement of the operation-linked unit with a magnetic force between the operation follower unit and the operation-linked unit. At least one of the operation-linked unit or the operation follower unit is magnetic. The drive unit is drivable in response to movement of the operation follower unit. The operation follower unit accommodated in a chamber is spaced from the operation-linked unit.

20 Claims, 18 Drawing Sheets

1S

(51) Int. Cl.
*H01H 13/20* (2006.01)
*H01H 21/22* (2006.01)

(56) References Cited

U.S. PATENT DOCUMENTS

| | | | | |
|---|---|---|---|---|
| 2011/0128102 | A1* | 6/2011 | Pfeiffer .............. | H01H 36/0073 335/206 |
| 2020/0006019 | A1 | 1/2020 | Hikawa et al. | |

* cited by examiner

SWITCH

CROSS-REFERENCE TO RELATED APPLICATION

This application claims priority to Japanese Patent Application No. 2021-108913 filed on Jun. 30, 2021, the contents of which are incorporated herein by reference.

FIELD

The present disclosure relates to a switch including a movable unit that moves in response to an operation.

BACKGROUND

A trigger switch is widely used to control the operation of a power tool in response to a depressing operation. The trigger switch is to have higher airtightness, or for example, to be waterproof or dustproof. The switch described in, for example, Patent Literature 1 includes, for a circuit for the trigger, a housing with increased airtightness by simplifying the joint between a case and a cover in the housing.

CITATION LIST

Non-Patent Literature

Patent Literature 1: Japanese Unexamined Patent Application Publication No. 2020-4645

SUMMARY

The trigger that moves in response to an operation extends through the housing. As the trigger moves, the inner volume of the housing changes with the change in the flow of air, thus causing the housing to be less airtight.

A switch according to one or more embodiments that may easily achieve airtightness.

A switch according to one or more embodiments is a switch for driving a drive unit. The switch may include a movable unit movable in response to an operation. The drive unit is drivable in response to movement of the movable unit. The switch may include an operation-linked unit movable in response to the movement of the movable unit receiving the operation and an operation follower unit spaced from the operation-linked unit. The operation follower unit is movable in response to movement of the operation-linked unit with a magnetic force between the operation follower unit and the operation-linked unit. At least one of the operation-linked unit or the operation follower unit is magnetic. The drive unit is drivable in response to movement of the operation follower unit.

The switch may further include a chamber accommodating the operation follower unit. The operation follower unit accommodated in the chamber is spaced from the operation-linked unit.

In the switch, the drive unit is drivable based on a result of detecting the movement of the operation follower unit contactlessly.

The switch may further include an electrode adjacent to a movable range of the operation follower unit. The operation follower unit is dielectric. The drive unit is drivable based on a result of detecting the movement of the operation follower unit contactlessly as a change in a capacitance of a capacitor formed with the operation follower unit and the electrode.

The switch may further include a fixed contact. The operation follower unit includes a slider slidable on the fixed contact in response to the movement of the operation follower unit. The drive unit is drivable based on a result of detecting the movement of the operation follower unit as a change in a conductive state or an electric resistance value of the fixed contact.

The switch may further include a switch member operable in response to a switching operation to switch a driving mode of the drive unit, a switch-linked unit movable in response to an operation of the switch member receiving the switching operation, and a switch follower unit spaced from the switch-linked unit. The switch follower unit is movable in response to movement of the switch-linked unit with a magnetic force between the switch follower unit and the switch-linked unit. At least one of the switch-linked unit or the switch follower unit has magnetism. The driving mode of the drive unit is switchable in response to movement of the switch follower unit.

A switch according to one or more embodiments is a switch for driving a drive unit. The switch may include a movable unit movable in response to an operation. The drive unit is drivable in response to movement of the movable unit. The switch includes a switch member operable in response to a switching operation to switch a driving mode of the drive unit, a switch-linked unit movable in response to an operation of the switch member receiving the switching operation, and a switch follower unit spaced from the switch-linked unit. The switch follower unit is movable in response to movement of the switch-linked unit with a magnetic force between the switch follower unit and the switch-linked unit. At least one of the switch-linked unit or the switch follower unit is magnetic. The driving mode of the drive unit is switchable in response to movement of the switch follower unit.

The switch may further include a chamber accommodating the switch follower unit. The switch follower unit accommodated in the chamber is spaced from the switch-linked unit.

The switch is incorporated into an electric device including the drive unit drivable in response to an electric signal. The switch may further include an output unit that outputs the electric signal to drive the drive unit. The output unit outputs the electric signal to drive the drive unit.

The switch according to one or more embodiments may easily achieve airtightness by using a magnetic force to separate components operable in response to an operation from components for driving a drive unit.

DETAILED DESCRIPTION

Figure 1:
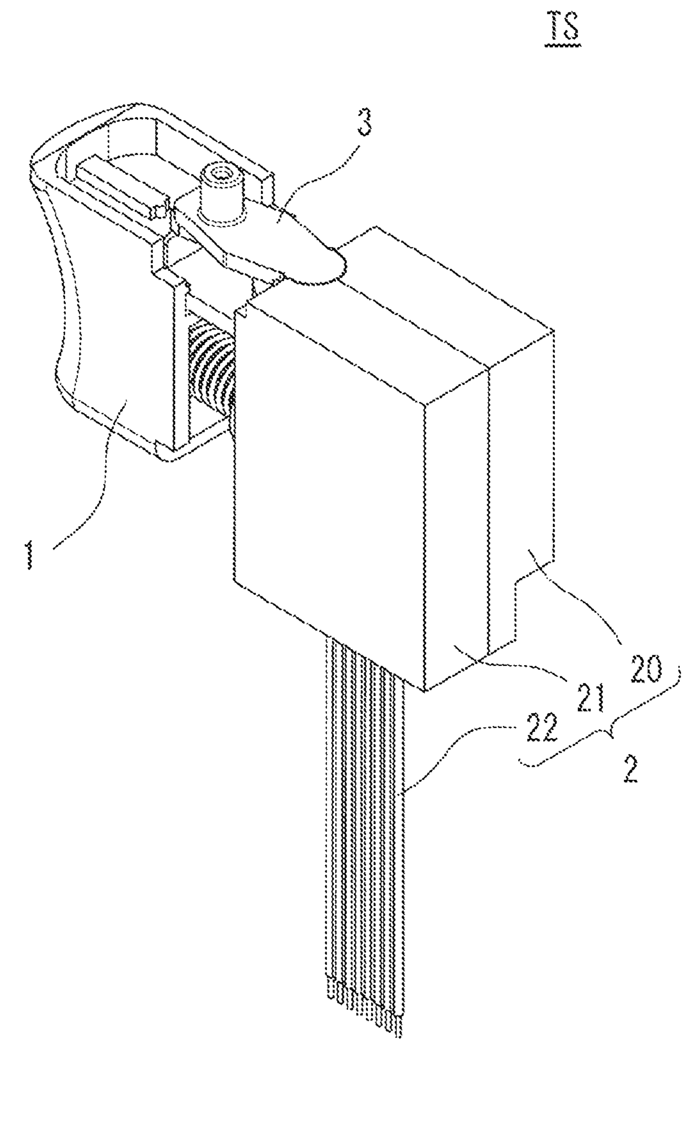
FIG. 1 is a diagram illustrating a perspective view of a switch according to one or more embodiments, showing an example appearance.

One or more embodiments will now be described with reference to the drawings.

Example Use

A switch according to one or more embodiments of the present disclosure is incorporated in various electric devices such as electric drills, electric saws, electric screwdrivers, electric wrenches, electric grinders, and other power tools including a motor or another drive unit as, for example, a trigger switch. The switch according to one or more embodiments of the present disclosure may be implemented in various manners described in first and second embodiments below. As the switch according to the embodiments of the present disclosure used as a trigger switch, a switch TS illustrated in the drawings and an electric device ET incorporating the switch TS will be described with reference to the drawings.

First Embodiment

Example Structure of Appearance

FIG. 1 is a perspective view of the switch TS according to an embodiment of the present disclosure, showing its example appearance. FIG. 1 shows the appearance of the switch TS being a trigger switch that can be incorporated into the electric device ET such as a power tool. The switch TS incorporated in the electric device ET is operable by a user. The user depresses a movable unit 1, as a trigger, in the switch TS to drive a drive unit M (refer to, for example, FIG. 18), such as an electric motor, incorporated in the electric device ET. The orientation of the switch TS is hereafter defined, as viewed from the user, as the front being the surface on which the movable unit 1 is attached and the rear being the depressing direction of the movable unit 1. In the state shown in FIG. 1, the switch TS has the front on the left far side in FIG. 1, the rear on the right near side, the right on the right far side, and the left on the left near side in the figure.

The switch TS includes a substantially rectangular housing 2, the movable unit 1, and a switch lever 3. The housing 2 is incorporated into the electric device ET. The movable unit 1 as a trigger can be depressed by the user. The switch lever 3 (switch member) receives a switching operation for switching the driving direction of the drive unit M. The switch lever 3 performs a switching operation such as switching the rotation direction of an electric screwdriver between the forward rotation and the reverse rotation. The housing 2 includes a first half body 20 on the right and a second half body 21 on the left joined together. A communication line 22 extends from the bottom surface of the housing 2. The communication line 22 transmits signals for driving the drive unit M.

Example Internal Structure

Figure 2:
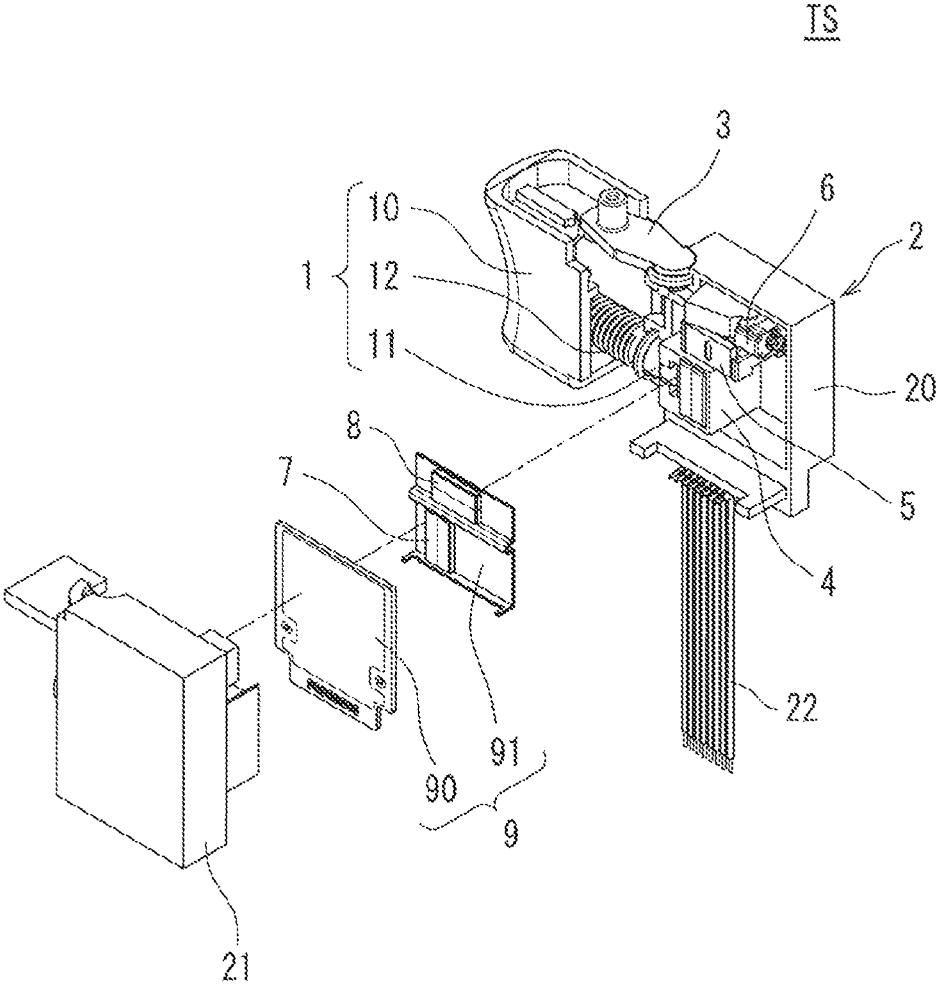
FIG. 2 is a diagram illustrating an exploded perspective view of a switch according to one or more embodiments.
Figure 3:
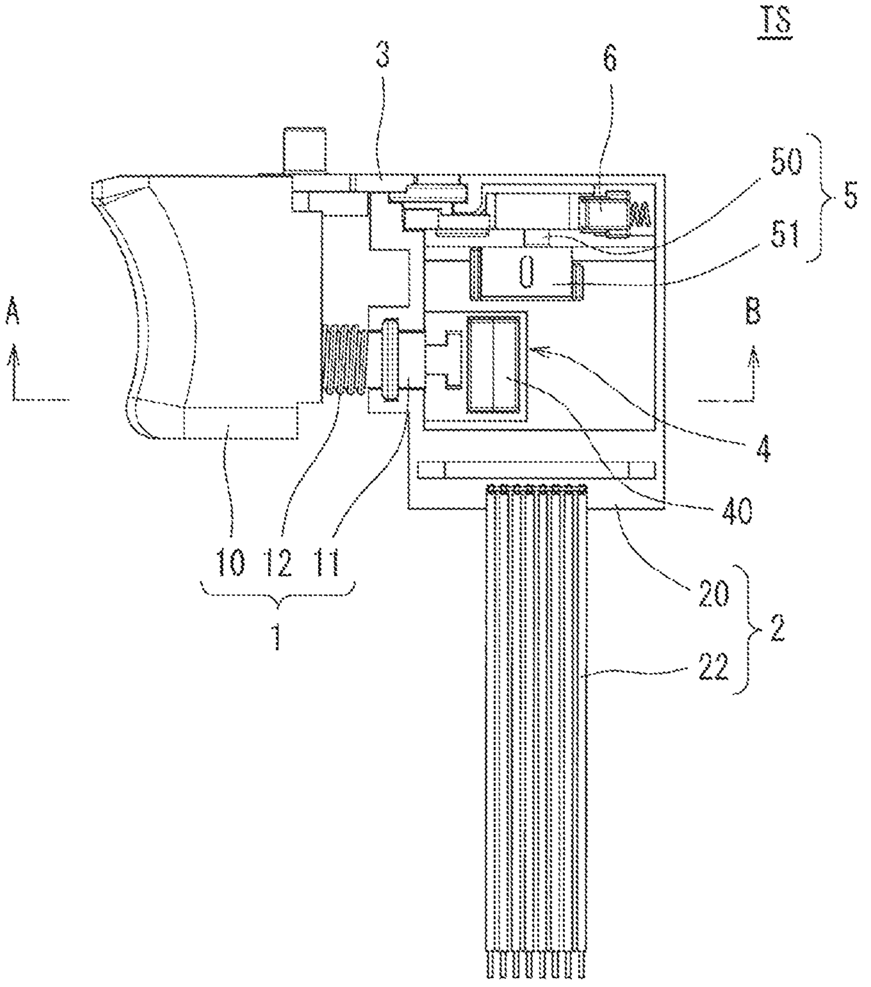
FIG. 3 is a diagram illustrating a side view of a switch according to one or more embodiments.
Figure 4:
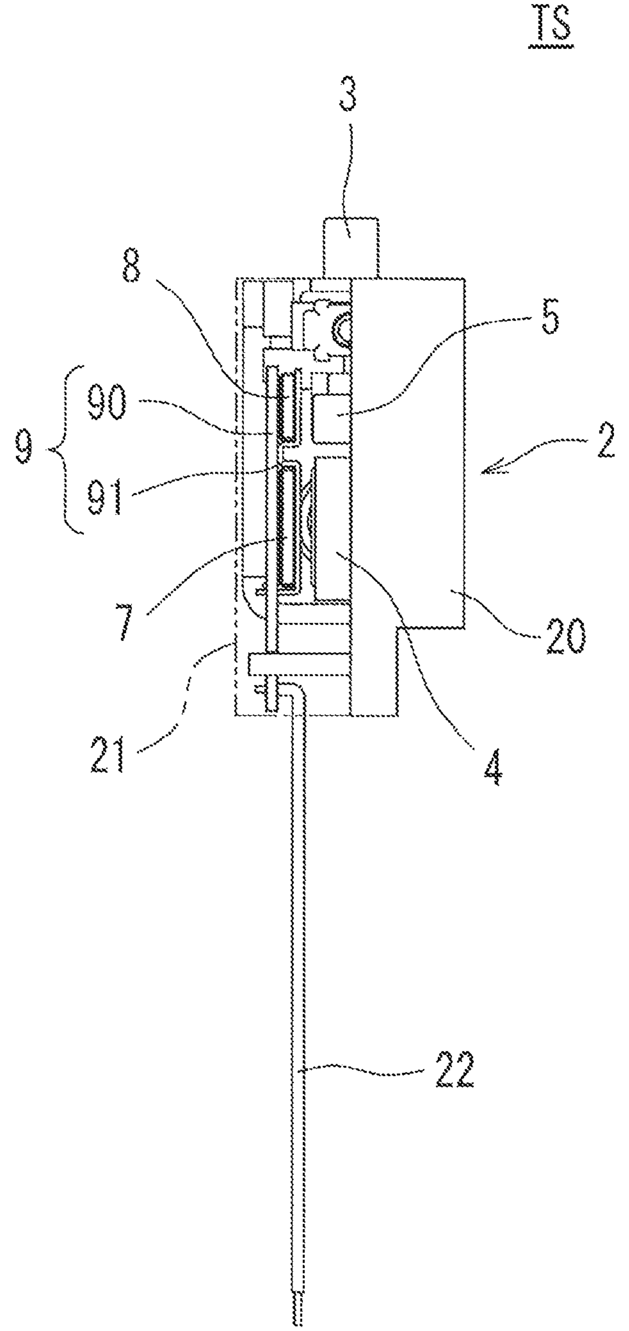
FIG. 4 is a diagram illustrating a rear view of a switch according to one or more embodiments.
Figure 5:
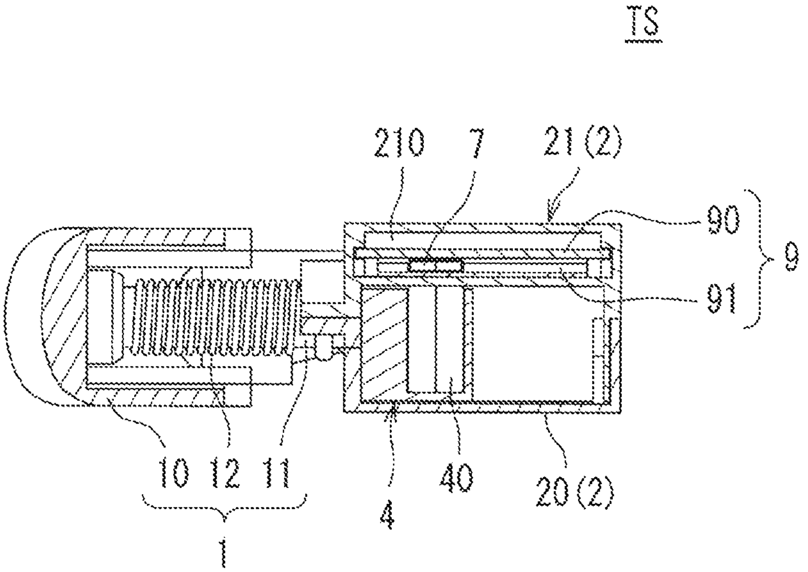
FIG. 5 is a diagram illustrating a cross-sectional view of a switch according to one or more embodiments

The internal structure of the switch TS will now be described. FIG. 2 is a exploded perspective view of the switch TS according to the embodiment of the present disclosure. FIG. 3 is a side view of the switch TS according to the embodiment of the present disclosure. FIG. 4 is a rear view of the switch TS according to the embodiment of the present disclosure. FIG. 5 is a cross-sectional view of the switch TS according to the embodiment of the present disclosure. FIG. 3 is a left side view of the switch TS without showing the second half body 21 on the left in the housing 2 and components in the second half body 21. In FIG. 4, the second half body 21 of the housing 2 is not shown. FIG. 5 is a bottom cross-sectional view of the switch TS taken along line A-B in FIG. 3.

The switch TS includes, for example, an operation-linked unit 4, a switch-linked unit 5, an engagement member 6, an operation follower unit 7, a switch follower unit 8, and a holder 9 in the housing 2, in addition to the movable unit 1 and the switch lever 3 described above. The second half body 21 of the housing 2 has a space as a chamber 210 for accommodating the operation follower unit 7, the switch follower unit 8, and the holder 9. The chamber 210 is a rectangular box. The chamber 210 is hermetically sealed. The chamber 210 accommodates the holder 9 for holding components such as the operation follower unit 7 and the switch follower unit 8. The operation follower unit 7 and the switch follower unit 8 held by the holder 9 are hermetically sealed in the chamber 210. The components such as the operation follower unit 7 and the switch follower unit 8 accommodated in the chamber 210 are thus spaced from, for example, the operation-linked unit 4 and the switch-linked unit 5.

The second half body 21 is molded with the space as the chamber 210 having an open bottom surface. The space as the chamber 210 in the molded second half body 21 receives the components such as the operation follower unit 7, the switch follower unit 8, and the holder 9 from below. The bottom surface of the space is then sealed with a resin. The chamber 210 with the above described structure is highly airtight, or for example, is waterproof or dustproof.

The components in the switch TS including the movable unit 1 will now be described with reference to FIGS. 2, 3, 4, and 5. The movable unit 1 included in the switch TS includes an operation part 10 and a shaft 11. The operation part 10 receives a depressing operation performed by the user. The shaft 11 extends from the operation part 10 to the housing 2. The shaft 11 is elongated and is substantially cylindrical. The shaft 11 extends into the housing 2 through a through-hole in the front wall surface of the housing 2. The shaft 11 has a return spring 12 wound around the shaft 11. The return spring 12 may be a compressed coil spring. The return spring 12 has its front end in contact with the operation part 10 and its rear end in contact with the wall surface of the housing 2. The return spring 12 urges the operation part 10 forward. In response to a depressing operation on the operation part 10, the movable unit 1 moves backward, which is the depressing direction. In response to the depressing operation being released, the movable unit 1 moves forward as the return spring 12 urges the movable unit 1 forward, opposite to the depressing direction.

The shaft 11 in the movable unit 1 accommodated in the housing 2 has a rear end in the depressing direction to which the operation-linked unit 4 is attached. The operation-linked unit 4 moves as the movable unit 1 moves. The operation-linked unit 4 is a substantially rectangular prism. The operation-linked unit 4 is attached to the shaft 11 on its front side surface. The operation-linked unit 4 moves back and forth as the movable unit 1 moves. The operation-linked unit 4 incorporates a first magnet 40 and is thus magnetic. The first magnet 40 is a permanent magnet. The first magnet 40 is located to have its magnetic poles positioned in the front-rear direction, for example, the south pole positioned frontward and the north pole positioned rearward. The first magnet 40 forms a magnetic field that affects the operation follower unit 7.

Figure 6:
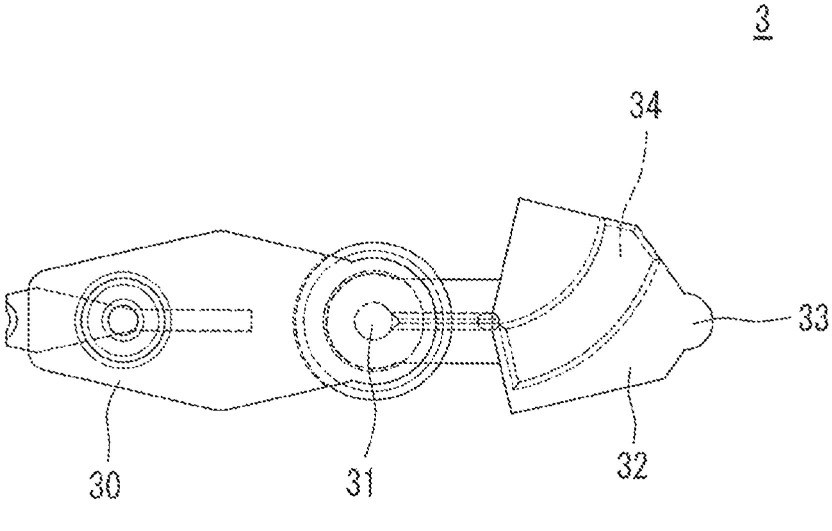
FIG. 6 is a diagram illustrating a external view of an example switch lever included in a switch according to one or more embodiments.
Figure 7:
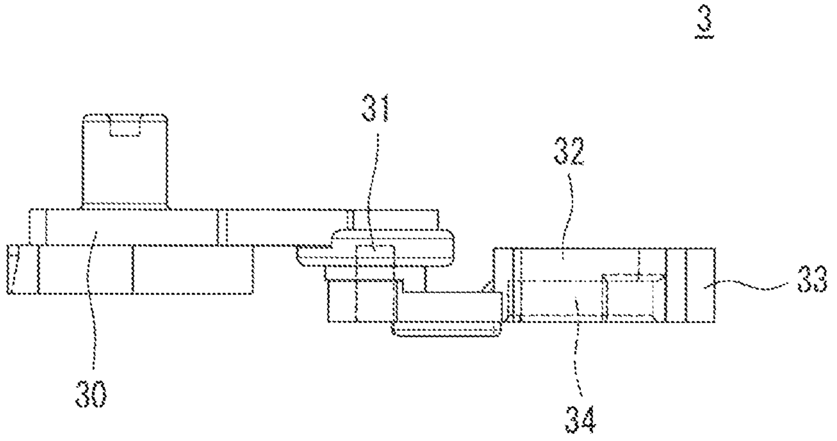
FIG. 7 is a diagram illustrating a external view of an example switch lever included in a switch according to one or more embodiments.
Figure 8:
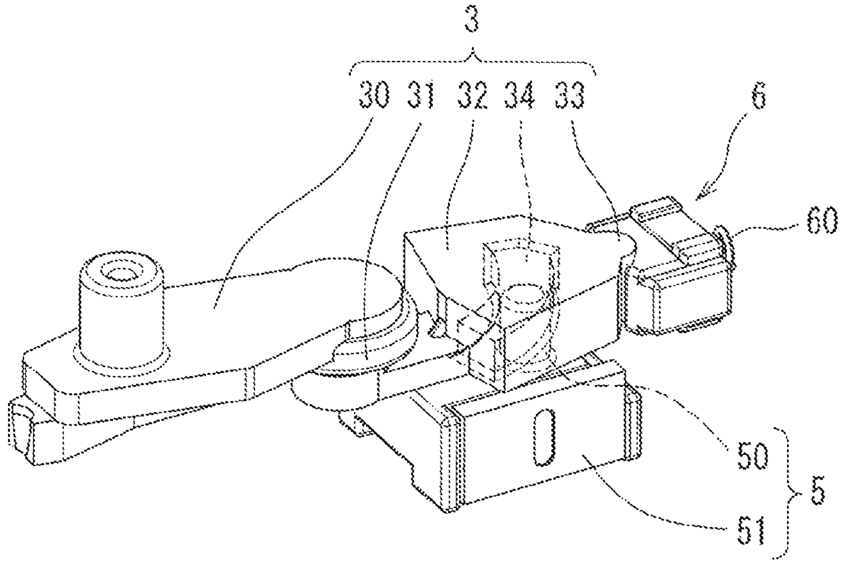
FIG. 8 is a diagram illustrating a perspective view of an example switch lever, an example switch-linked unit, and an example engagement member included in a switch according to one or more embodiments.

FIGS. 6 and 7 are external views of an example of the switch lever 3 included in the switch TS according to the embodiment of the present disclosure. FIG. 8 is a perspective view of examples of the switch lever 3, the switch-linked unit 5, and the engagement member 6 included in the switch TS according to the embodiment of the present disclosure. In FIGS. 6, 7, and 8, some of the hidden components are indicated by broken lines. The components including the switch lever 3 will now be described with reference to FIGS. 2, 3, 4, 5, 6, 7, and 8. The switch lever 3 includes, for example, a lever 30, a swing shaft 31, and an action portion 32. The lever 30 receives a swing operation performed by the user. The swing shaft 31 is a shaft for swinging. The action portion 32 is operable in response to the swing operation. The switch lever 3 is held in a swingable manner with the swing shaft 31 received in a support hole in the upper surface of the housing 2. The lever 30 is attached to an upper end of the swing shaft 31 and extends frontward. The lever 30 is located above the housing 2. The action portion 32 is accommodated in the housing 2. The action portion 32 is attached to a lower end of the swing shaft 31 and extends rearward. The action portion 32 is a substantially round pentagon as viewed in plan, and has a vertex at the rear end being an engagement vertex 33. The engagement vertex 33 is semicircular and is engaged with the engagement member 6. The action portion 32 has an arc-shaped cam groove 34 on its bottom surface.

The switch-linked unit 5 is located below the switch lever 3 in a manner movable back and forth. The switch-linked unit 5 moves as the switch lever 3 moves. The switch-linked unit 5 is a substantially rectangular prism. The switch-linked unit 5 includes a substantially cylindrical cam protrusion 50 on its upper surface. The cam protrusion 50 protruding on the upper surface is loosely fitted in the cam groove 34 on the bottom surface of the switch lever 3. The cam protrusion 50 and the cam groove 34 are engaged with each other, which allows the action portion 32 in the switch lever 3 to function as a cam driver and allows the switch-linked unit 5 to function as a cam follower. The switch-linked unit 5 incorporates a second magnet 51 on its left side surface and is thus magnetic. The second magnet 51 is a permanent magnet. The second magnet 51 forms a magnetic field that affects the switch follower unit 8.

The engagement member 6 is located behind the switch lever 3. The engagement member 6 is engaged with the switch lever 3 as a pusher for pressing the switch lever 3 forward. The engagement member 6 has a front end facing the switch lever 3. The front end is M-shaped as viewed in plan. The engagement member 6 includes a pusher spring 60 at its rear. The pusher spring 60 is, for example, a coil spring and urges the engagement member 6 forward.

In response to an operation for swinging the switch lever 3 performed by the user, the switch lever 3 swings. The engagement member 6 urged by the pusher spring 60 is engaged with the engagement vertex 33 while pressing the engagement vertex 33 in the switch lever 3 with the recess or the side portion of the M-shape. The switch lever 3 is thus held at the swing position.

Figure 9:
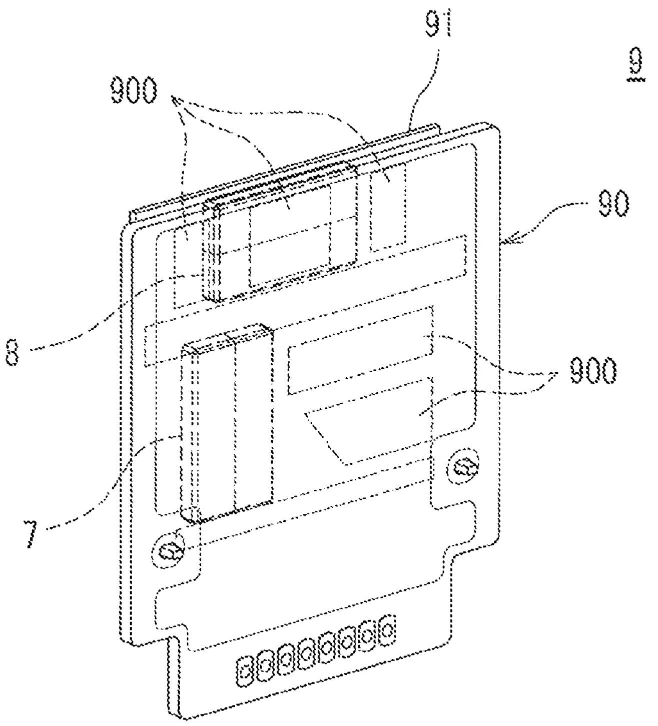
FIG. 9 is a diagram illustrating a perspective view of an example operation follower unit, an example switch follower unit, and an example holder included in a switch according to one or more embodiments.
Figure 10:
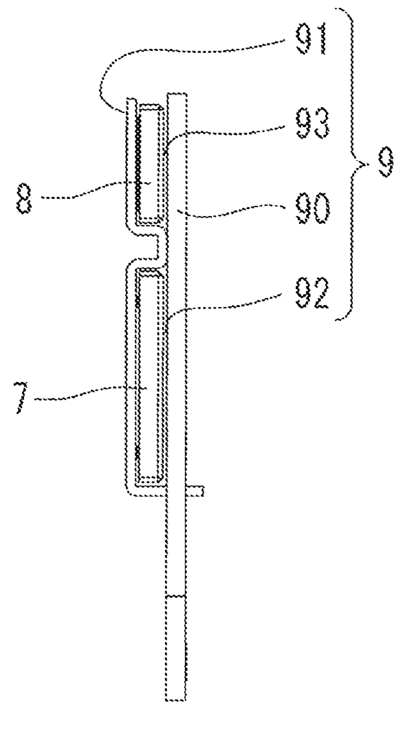
FIG. 10 is a diagram illustrating a front view of an example operation follower unit, an example switch follower unit, and an example holder included in a switch according to one or more embodiments.

FIG. 9 is a perspective view of examples of the operation follower unit 7, the switch follower unit 8, and the holder 9 included in the switch TS according to the embodiment of the present disclosure. FIG. 10 is a front view of the examples of the operation follower unit 7, the switch follower unit 8, and the holder 9 included in the switch TS according to the embodiment of the present disclosure. In FIG. 9, some of the hidden components are indicated by broken lines. The operation follower unit 7, the switch follower unit 8, and the holder 9 will now be described with reference to FIGS. 2, 3, 4, 5, 9, and 10. The holder 9 includes a substrate 90 and a wall plate 91 joined together. The substrate 90 is a flat plate. The substrate 90 includes, on its surface adjacent to the wall plate 91, multiple thin plate-like electrodes 900 to be electrically connected to a circuit (not shown). The wall plate 91 is a flat plate. The wall plate 91 has a bottom end and a substantially middle portion that are bent toward the substrate 90. The bent portions extend in the front-rear direction. In the holder 9, the substrate 90, and the wall plate 91 are joined together with their flat plate portions substantially parallel to each other and the bent portions of the wall plate 91 attached to the substrate 90. The holder 9 includes a lower chamber 92 and an upper chamber 93 between the surfaces of the substrate 90 and the wall plate 91 facing each other and the bent portions of the wall plate 91. The lower chamber 92 accommodates the operation follower unit 7 in a manner movable back and forth. The upper chamber 93 accommodates the switch follower unit 8 in a manner movable back and forth. The inner surface portions of the wall plate 91 that face the lower chamber 92 and the upper chamber 93 include conductive plates attached to them, which form capacitors between the conductive plates and the electrodes 900 attached to the substrate 90.

The operation follower unit 7 is a substantially rectangular plate. The operation follower unit 7 is accommodated in the lower chamber 92 with a direction normal to its surfaces being the right-left direction. The operation follower unit 7 has a height and a lateral width slightly shorter than the height and the lateral width of the lower chamber 92. The operation follower unit 7 is thus movable back and forth in the lower chamber 92. The operation follower unit 7 is a magnetic body formed from a plastic magnetic material and is magnetic. The operation follower unit 7 forms the capacitor as a dielectric. The operation follower unit 7 is located to have its magnetic poles positioned in the front-rear direction, for example, the north pole positioned frontward and the south pole positioned rearward. The north pole and the south pole of the operation follower unit 7 are opposite to the north pole and the south pole of the adjacent first magnet 40, which causes the north pole of the operation follower unit 7 frontward in the operation follower unit 7 to face the south pole of the first magnet 40 rearward in the first magnet 40, and the south pole of the operation follower unit 7 rearward in the operation follower unit 7 to face the north pole of the first magnet 40 rearward in the first magnet 40. The operation follower unit 7 and the first magnet 40 thus attract each other. The operation follower unit 7 moves back and forth accordingly as the first magnet 40 moves in the front-rear direction.

The switch follower unit 8 is a substantially rectangular plate. The switch follower unit 8 is accommodated in the upper chamber 93 with a direction normal to its surfaces being the right-left direction. The switch follower unit 8 has a height and a lateral width slightly shorter than the height and the lateral width of the upper chamber 93. The switch follower unit 8 is thus movable back and forth in the upper chamber 93. The switch follower unit 8 is a magnetic body formed from a plastic magnetic material and is magnetic. The switch follower unit 8 forms the capacitor as a dielectric. The switch follower unit 8 is located to cause the switch follower unit 8 and the second magnet 51 to attract each other. The switch follower unit 8 moves back and forth accordingly as the second magnet 51 moves in the front-rear direction.

The electrodes 900 attached to the substrate 90 face the lower chamber 92 or the upper chamber 93. Two electrodes 900 are vertically aligned in the lower chamber 92. The upper electrode 900 is substantially rectangular. The lower electrode 900 is substantially trapezoidal. The substantially trapezoidal lower electrode 900 has a vertical length that is the shortest at the front end, gradually increases toward the rear, and is constant beyond a specific position. Three electrodes 900, which are each substantially rectangular, are aligned in the front-rear direction in the upper chamber 93.

The operation follower unit 7 and the switch follower unit 8, which are held by the holder 9 in a movable manner, are accommodated in the chamber 210 in the second half body 21 of the housing 2, which is sealed with a sealing method such as resin sealing.

Operation

The operation of the switch TS will now be described.

Driving Operation

Figure 11:
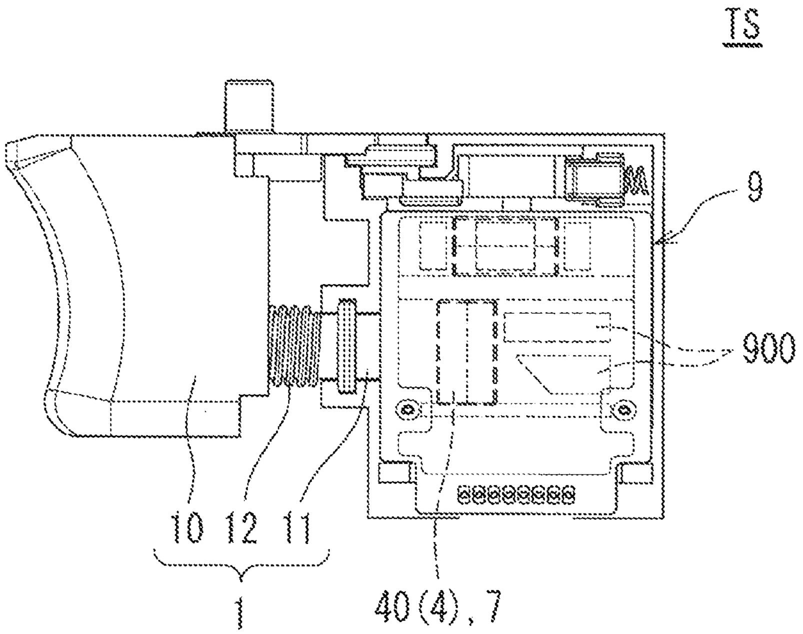
FIG. 11 is a diagram illustrating a side view of a switch according to one or more embodiments.
Figure 12:
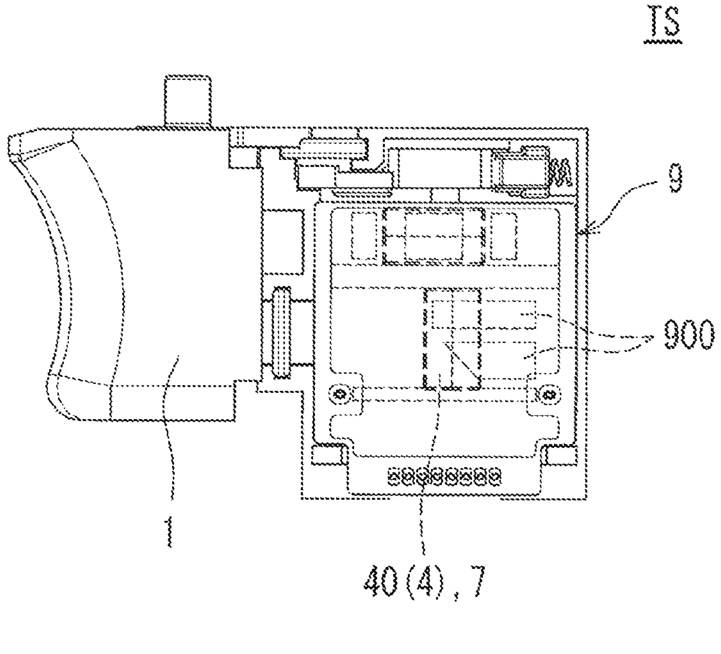
FIG. 12 is a diagram illustrating a side view of a switch according to one or more embodiments.
Figure 13:
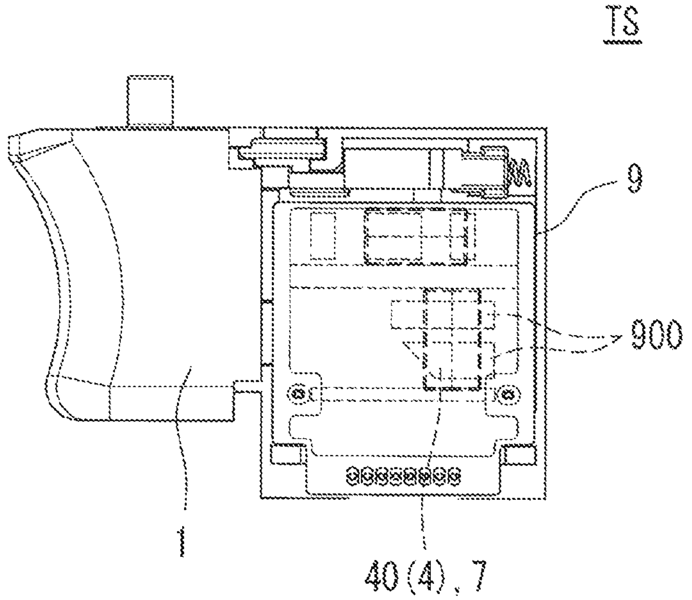
FIG. 13 is a diagram illustrating a side view of a switch according to one or more embodiments.

The operation of the switch TS in response to a depressing operation on the movable unit 1 will first be described. FIGS. 11, 12, and 13 are side views of the switch TS according to the embodiment of the present disclosure. FIGS. 11, 12, and 13 do not show the first half body 20 and indicate some of the hidden components such as the electrodes 900 attached to the substrate 90 by broken lines to show the internal structure. In FIG. 11, the switch TS is not depressed on the movable unit 1. The movable unit 1 that is not depressed is urged by the return spring 12 and is at the front end (the left side in FIG. 11) of its movable range. The operation-linked unit 4 attached to the shaft 11 in the movable unit 1 is at the front end of its movable range similarly. In the state shown in FIG. 11 in which the operation-linked unit 4 is at the front end of its movable range, the first magnet 40 attached to the operation-linked unit 4 is at the front end of its movable range. With the first magnet 40 being at the front end of its movable range, the operation follower unit 7 is also at the front end of its movable range. The operation follower unit 7 and the first magnet 40, which attract each other with a magnetic force, are both at the front ends of their movable ranges. The operation follower unit 7 and the first magnet 40 thus overlap each other as viewed from the viewpoint in FIG. 11. The operation follower unit 7 at the front end of its movable range is spaced from the electrodes 900 in the lower chamber 92. The electrodes 900 in the lower chamber 92 thus do not form a capacitor having a sufficiently high capacitance.

FIG. 12 shows the movable unit 1 in the state in FIG. 11 being depressed. In response to the depressing operation, the movable unit 1 moves backward, which is the depressing direction. The first magnet 40 in the operation-linked unit 4 moves backward as the movable unit 1 receiving the depressing operation moves. The operation follower unit 7 moves backward accordingly as the first magnet 40 moves. In the state shown in FIG. 12, the operation follower unit 7 is near the upper and lower electrodes 900 in the lower chamber 92, which forms a capacitor between the upper and lower electrodes 900 in the lower chamber 92 and the conductive plates attached to the wall plate 91 facing the lower chamber 92 with the operation follower unit 7 as a dielectric. The lower electrode 900 is substantially trapezoidal. The areas of the electrodes 900 that form the capacitor thus change depending on the position of the operation follower unit 7. Thus, when the operation follower unit 7 is near the oblique side of the substantially trapezoidal electrode 900 as shown in FIG. 12, the capacitance of the capacitor changes depending on the position of the operation follower unit 7.

FIG. 13 shows the movable unit 1 in the state in FIG. 12 being depressed further. In response to the depressing operation, the movable unit 1 in the state in FIG. 12 moves more backward. The first magnet 40 in the operation-linked unit 4 moves backward as the movable unit 1 receiving the depressing operation moves. The operation follower unit 7 moves backward accordingly as the first magnet 40 moves. In the state shown in FIG. 13, the operation follower unit 7 is near the upper and lower electrodes 900 in the lower chamber 92, thus forming a capacitor. The area of the lower electrode 900 near the operation follower unit 7 is larger than that of the lower electrode 900 shown in FIG. 12, thus causing the capacitor to have a larger capacitance.

Switching Operation

Figure 14:
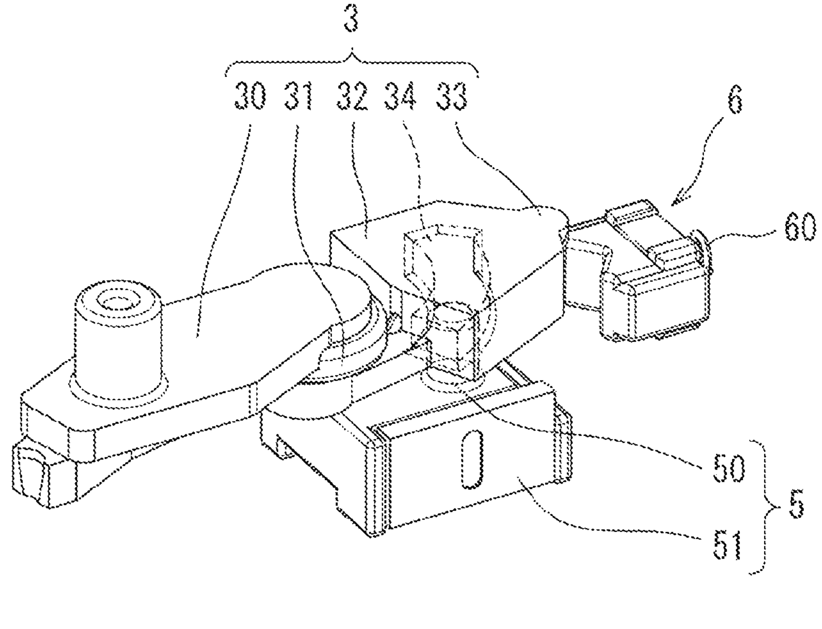
FIG. 14 is a diagram illustrating a perspective view of a switch lever, a switch-linked unit, and an engagement member included in a switch according to one or more embodiments, showing example appearances.
Figure 15:
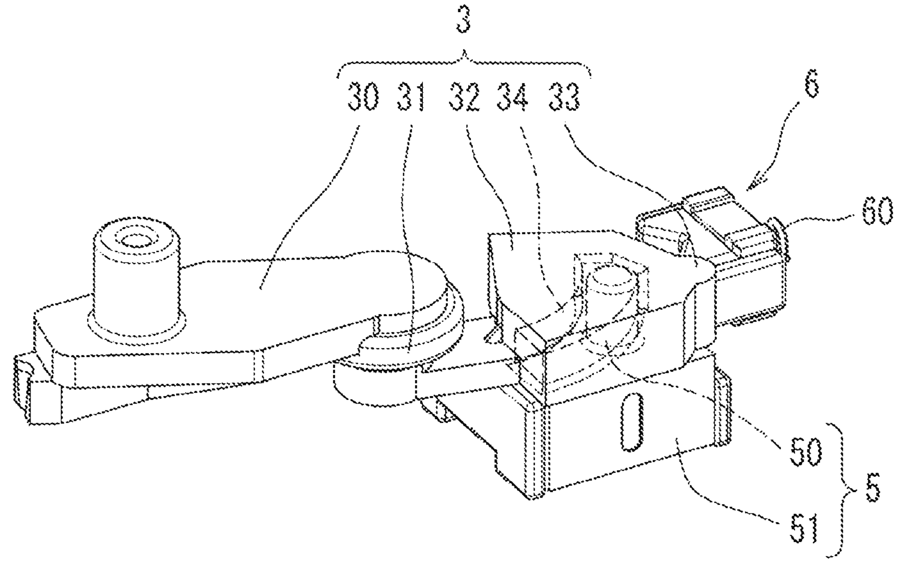
FIG. 15 is a diagram illustrating a perspective view of a switch lever, a switch-linked unit, and an engagement member included in a switch according to one or more embodiments, showing example appearances.

The operation of the of the switch TS in response to a switching operation on the switch lever 3 will now be described. FIGS. 14 and 15 are perspective views of the switch lever 3, the switch-linked unit 5, and the engagement member 6 included in the switch TS according to the embodiment of the present disclosure, showing their example appearances. The user performs an operation for swinging the switch lever 3 to switch the driving mode of the drive unit M. FIG. 14 shows the lever 30 moved to the left and the action portion 32 in the switch lever 3 moved to the right in response to an operation on the switch lever 3 for swinging leftward (counterclockwise) as viewed in plan. In response to the action portion 32 in the switch lever 3 moving to the right, the switch-linked unit 5, which includes the cam protrusion 50 loosely fitted in the cam groove 34 on the bottom surface of the action portion 32 and for which the movement direction is restricted to the front-rear direction, moves to the front end of its movable range. The second magnet 51 attached to the switch-linked unit 5 is at the front end of its movable range similarly. The engagement member 6 holds the switch lever 3 by pressing the engagement vertex 33 in the switch lever 3 on its right surface.

FIG. 15 shows the lever 30 moved to the right and the action portion 32 in the switch lever 3 moved to the left in response to an operation on the switch lever 3 for swinging rightward (clockwise) as viewed in plan. In response to the action portion 32 in the switch lever 3 moving to the left, the switch-linked unit 5 moves to the rear end of its movable range. The second magnet 51 is also at the rear end of its movable range. The engagement member 6 holds the switch lever 3 by pressing the engagement vertex 33 in the switch lever 3 on its left surface.

When the switch lever 3 is between the positions shown in FIGS. 14 and 15, the engagement member 6 holds the switch lever 3 by pressing the engagement vertex 33 in the switch lever 3 with the recess in the center of the M-shape.

Figure 16:
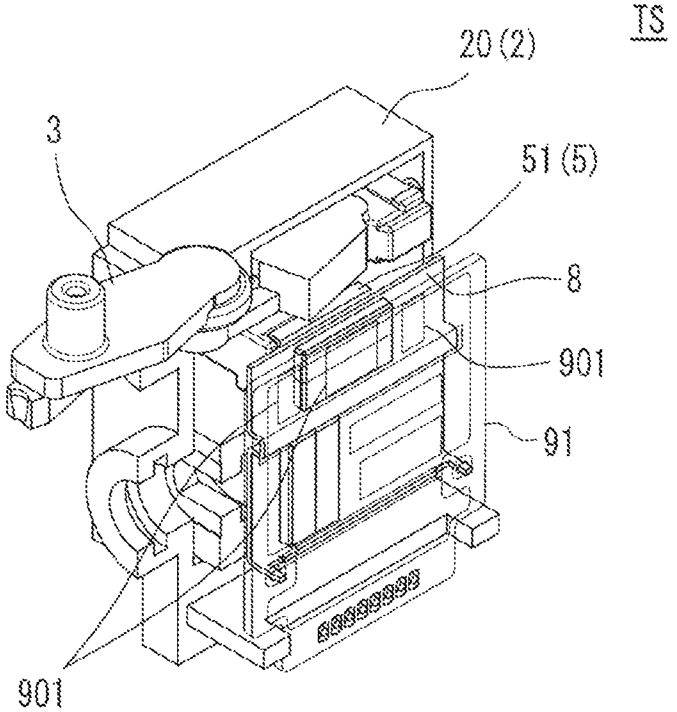
FIG. 16 is a diagram illustrating a perspective view of a switch according to one or more embodiments.
Figure 17:
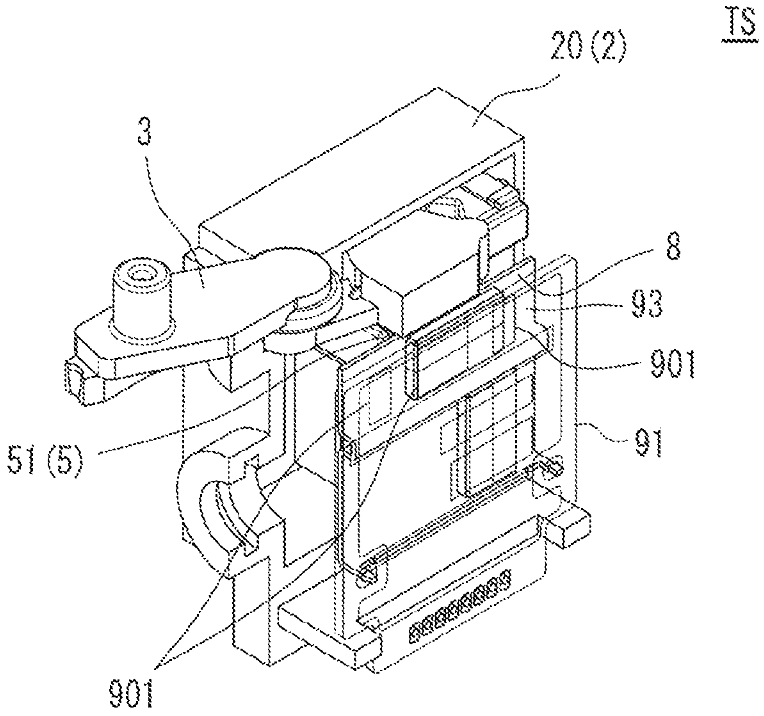
FIG. 17 is a diagram illustrating a perspective view of a switch according to one or more embodiments.

FIGS. 16 and 17 are perspective views of the switch TS according to the embodiment of the present disclosure. FIGS. 16 and 17 do not show the movable unit 1 and the second half body 21 of the housing 2 and indicate some of the components as being transparent to show the internal structure. FIG. 16 shows the state corresponding to the state in FIG. 14, with the switch lever 3 swung counterclockwise as viewed in plan. The second magnet 51 moves to the front end of its movable range in response to the switching operation on the switch lever 3 for swinging counterclockwise. The switch follower unit 8 is thus also at the front end of its movable range. In the state shown in FIG. 16, the switch follower unit 8 is near the front and central electrodes 900 in the upper chamber 93, which forms a capacitor between the front and central electrodes 900 in the upper chamber 93 and the conductive plates attached to the wall plate 91 facing the upper chamber 93 with the switch follower unit 8 as a dielectric.

FIG. 17 shows the state corresponding to the state in FIG. 15, with the switch lever 3 swung clockwise as viewed in plan. The second magnet 51 moves to the rear end of its movable range in response to the switch lever 3 receiving the switching operation for swinging the switch lever 3 clockwise. The switch follower unit 8 is thus also at the rear end of its movable range. In the state shown in FIG. 17, the switch follower unit 8 is near the central and rear electrodes 900 in the upper chamber 93, which forms a capacitor between the central and rear electrodes 900 in the upper chamber 93 and the conductive plates on the wall plate 91 with the switch follower unit 8 as a dielectric.

When the switch lever 3 is between the positions shown in FIGS. 16 and 17, the switch follower unit 8 is substantially in the middle of its movable range, forming a capacitor between the central electrode 900 in the upper chamber 93 and the conductive plates on the wall plate 91 with the switch follower unit 8 as a dielectric.

Electric Device

Figure 18:
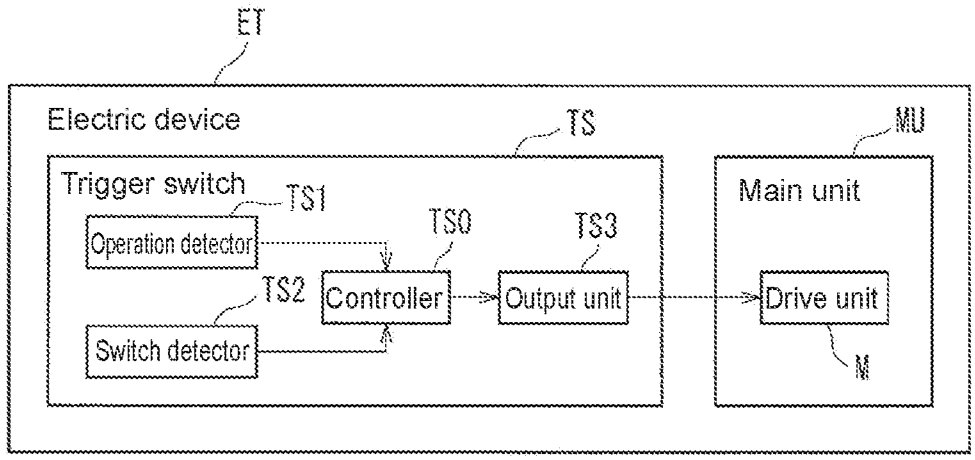
FIG. 18 is a diagram illustrating a block diagram of an electric device incorporating a switch according to one or more embodiments, showing an example control configuration.

An example configuration of the electric device ET incorporating the switch TS according to the embodiment of the present disclosure will now be described. FIG. 18 is a block diagram of the electric device ET incorporating the switch TS according to the embodiment of the present disclosure, showing its example control configuration. The electric device ET, such as a power tool, incorporates the switch TS in a main unit MU. The main unit MU includes the drive unit M such as a motor. The switch TS includes a controller TS0 for controlling the drive system, an operation detector TS1, a switch detector TS2, and an output unit TS3.

The operation detector TS1 is a circuit that detects a depressing operation on the movable unit 1 for driving the drive unit M. In the first embodiment, the operation detector TS1 includes a sensor that detects the capacitance of the capacitor formed with the operation follower unit 7 as a dielectric and various circuits. The operation detector TS1 detects a depressed amount of the movable unit 1 based on the capacitance between the two electrodes 900 in the lower chamber 92 on the substrate 90 and the conductive plates.

The switch detector TS2 is a circuit that detects a switching operation for swinging the switch lever 3. In the first embodiment, the switch detector TS2 includes a sensor that detects the capacitance of the capacitor formed with the switch follower unit 8 as a dielectric and various circuits. The switch detector TS2 detects the angle of the switch lever 3 based on the capacitance between the three electrodes 900 in the upper chamber 93 on the substrate 90 and the conductive plates.

The controller TS0 in the switch TS receives a detection result of the depressing operation from the operation detector TS1 and a detection result of the switching operation from the switch detector TS2. The controller TS0 determines an output of the drive unit M, such as the rotational speed of the motor, based on the detection result from the operation detector TS1. The controller TS0 determines a driving mode of the drive unit M, such as a rotation mode of the motor, based on the detection result from the switch detector TS2. The controller TS0 in the switch TS outputs, from the output unit TS3 to the main unit MU, an electric signal for driving the drive unit M with the driving mode determined based on the detection result from the switch detector TS2 and with the output based on the detection result from the operation detector TS1. The main unit MU drives the drive unit M in response to the electric signal input from the switch TS.

Figure 19:
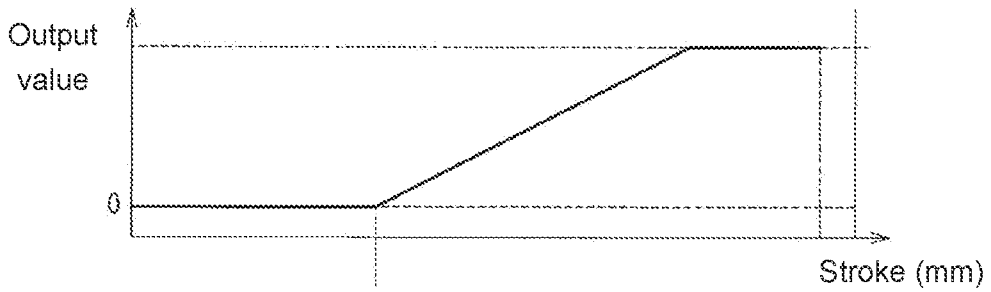
FIG. 19 is a graph illustrating an example relationship between a depressed amount of a movable unit and an output value for a switch according to one or more embodiments.

FIG. 19 is a graph showing an example relationship between the depressed amount of the movable unit 1 and an output value for the switch TS according to the embodiment of the present disclosure. In FIG. 19, the horizontal axis indicates the value for a stroke, which is the depressed amount of the movable unit 1, and the vertical axis indicates the output value for, for example, the rotational speed of the drive unit M. When the movable unit 1 is not depressed as illustrated in FIG. 11, a capacitor having a sufficiently high capacitance is not formed. The output value is thus 0. When the movable unit 1 is depressed as illustrated in FIG. 12, a capacitor having a capacitance corresponding to the areas of the electrodes 900 is formed and the output starts. The output increases in accordance with the increase in the depressed amount of the movable unit 1 in the section in which the vertical length of the electrode 900 changes. As illustrated in FIG. 13, the output value is constant in the section in which the areas of the electrodes 900 that form a capacitor are constant.

Figure 20:
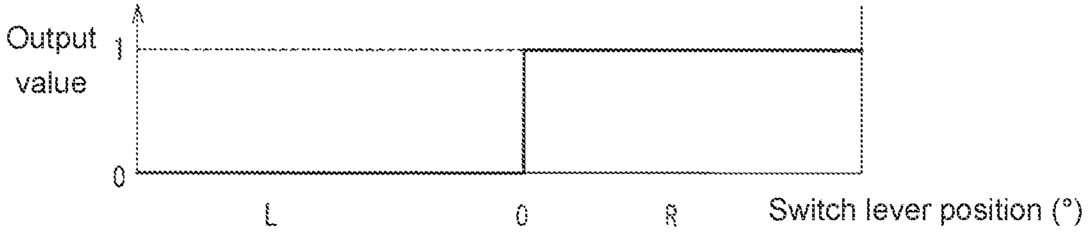
FIG. 20 is a graph illustrating an example relationship between an angle of a switch lever and an output value for a switch according to one or more embodiments.

FIG. 20 is a graph showing an example relationship between the angle of the switch lever 3 and an output value for the switch TS according to the embodiment of the present disclosure. In FIG. 20, the horizontal axis indicates the angle of the switch lever 3, and the vertical axis indicates the output value. The angle of the switch lever 3 is indicated, on the horizontal axis, by a 0 position, a swing angle L for a counterclockwise rotation, and a swing angle R for a clockwise rotation. For the switch lever 3 inclined to the left, as shown in FIGS. 14 and 16, the output value is 0 that indicates a forward rotation. For the switch lever 3 inclined to the right, the output value is 1 that indicates a reverse rotation.

As described above, the drive unit M is driven in response to an operation on the switch TS.

Second Embodiment

Example Structure of Appearance

In the second embodiment, the movements of the operation follower unit 7 and the switch follower unit 8 are detected based on the contact state of a mechanical contact unlike in the first embodiment in which the movements of the operation follower unit 7 and the switch follower unit 8 are detected contactlessly. In the second embodiment, like reference numerals denote like components in the first embodiment. The components in the first embodiment are to be referred to, and will not be described in detail. The appearance of a switch TS according to the second embodiment is substantially the same as in the first embodiment and will not be described in detail.

Example Internal Structure

Figure 21:
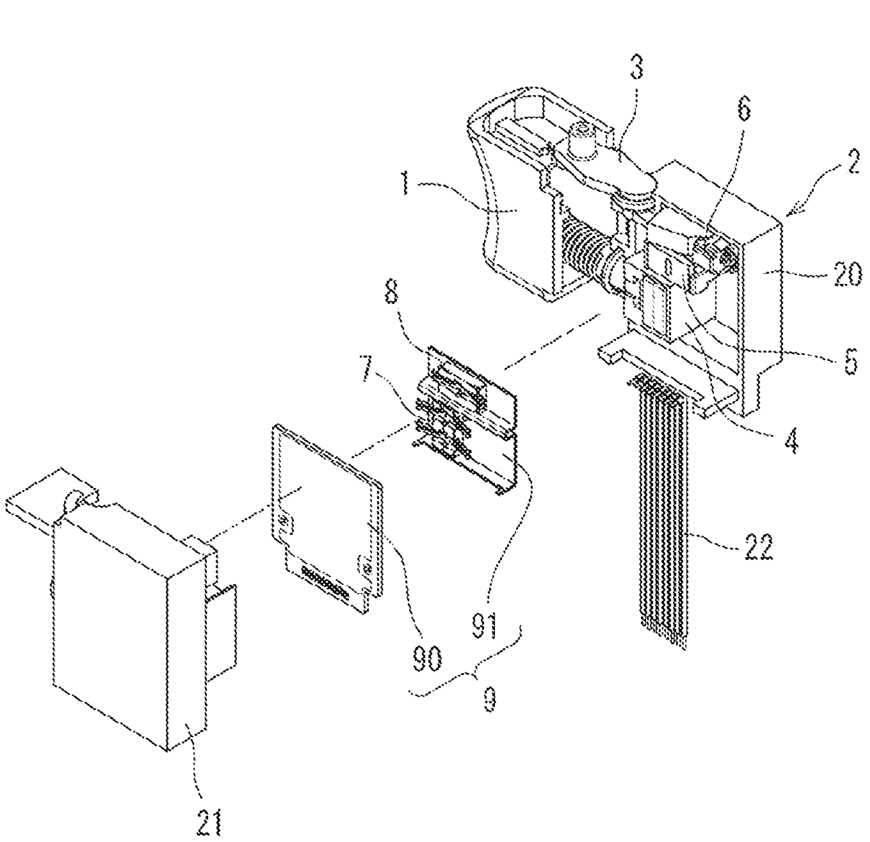
FIG. 21 is a diagram illustrating a exploded perspective view of a switch according to one or more embodiments.

The internal structure of the switch TS will now be described. FIG. 21 is a exploded perspective view of a switch TS according to an embodiment of the present disclosure. The switch TS includes, for example, a movable unit 1, a housing 2, a switch lever 3, an operation-linked unit 4, a switch-linked unit 5, an engagement member 6, an operation follower unit 7, a switch follower unit 8, and a holder 9. The structures of the movable unit 1, the housing 2, the switch lever 3, the operation-linked unit 4, the switch-linked unit 5, and the engagement member 6 in the second embodiment are substantially the same as in the first embodiment.

Figure 22:
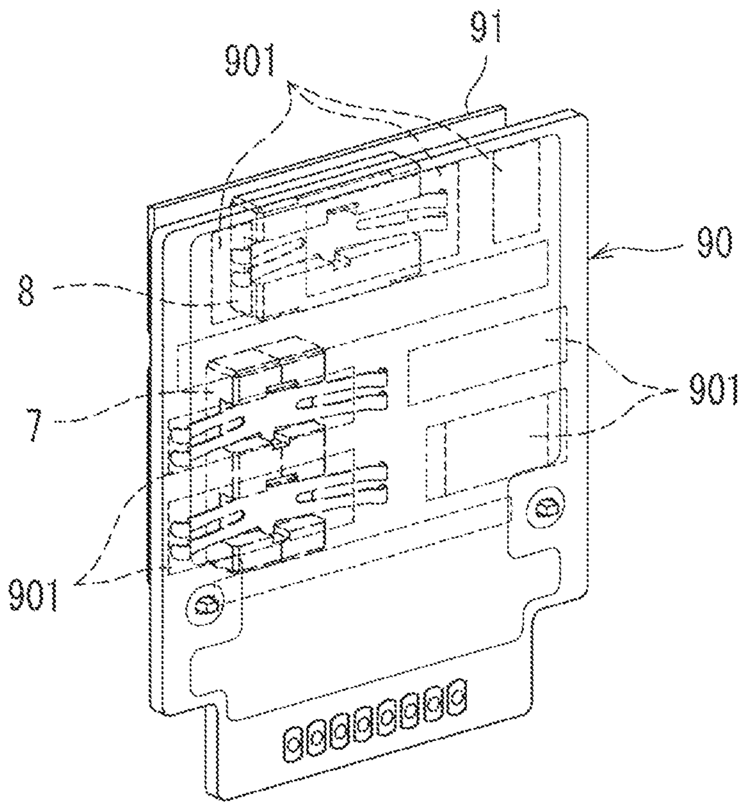
FIG. 22 is a diagram illustrating a perspective view of an example operation follower unit, an example switch follower unit, and an example holder included in a switch according to one or more embodiments.
Figure 23:
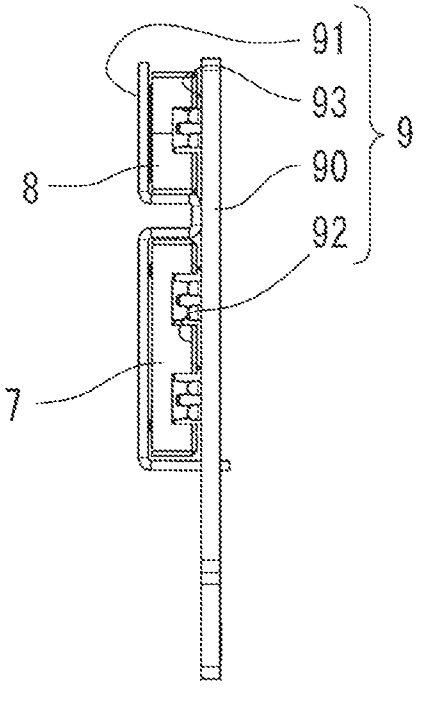
FIG. 23 is a diagram illustrating a front view of an example operation follower unit, an example switch follower unit, and an example holder included in a switch according to one or more embodiments.
Figure 24:
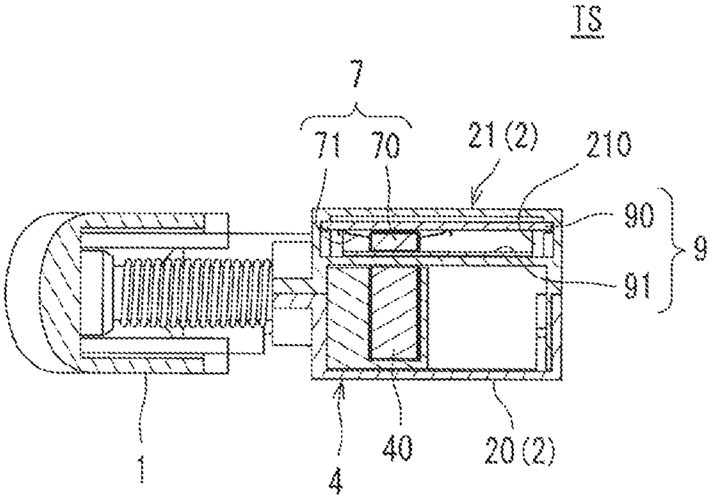
FIG. 24 is a diagram illustrating a cross-sectional view of a switch according to one or more embodiments.
Figure 25:
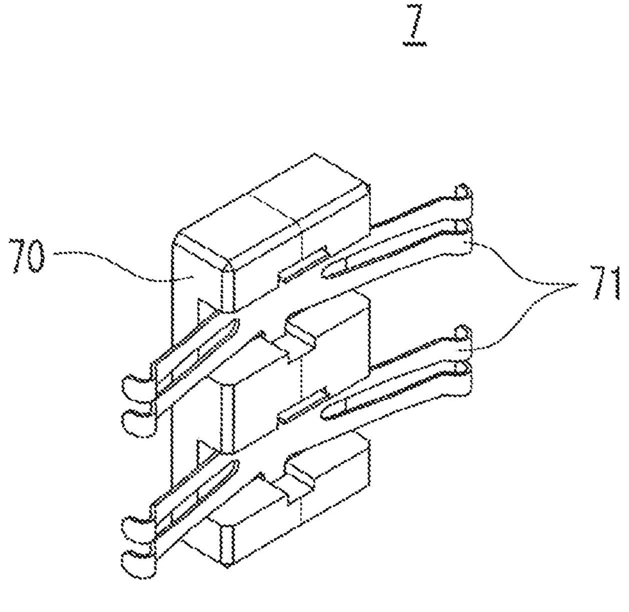
FIG. 25 is a diagram illustrating a perspective view of an example operation follower unit included in a switch according to one or more embodiments.
Figure 26:
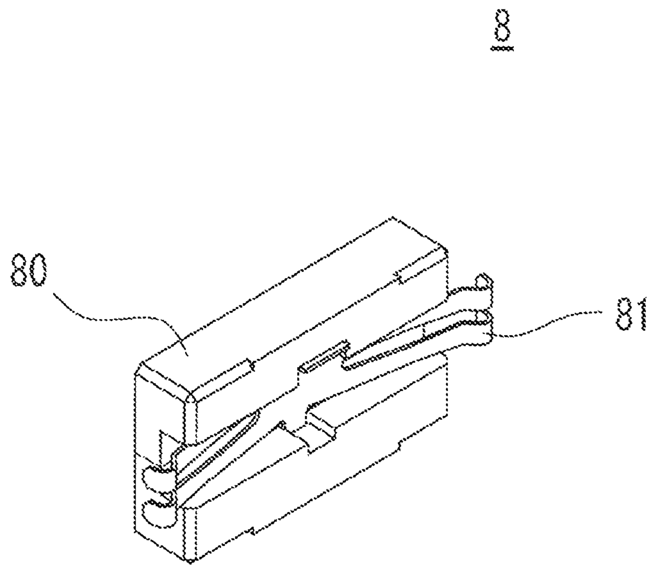
FIG. 26 is a diagram illustrating a perspective view of an example switch follower unit included in a switch according to one or more embodiments.

FIG. 22 is a perspective view of examples of the operation follower unit 7, the switch follower unit 8, and the holder 9 included in the switch TS according to the embodiment of the present disclosure. FIG. 23 is a front view of the examples of the operation follower unit 7, the switch follower unit 8, and the holder 9 included in the switch TS according to the embodiment of the present disclosure. FIG. 24 is a cross-sectional view of the switch TS according to the embodiment of the present disclosure. FIG. 25 is a perspective view of the example of the operation follower unit 7 included in the switch TS according to the embodiment of the present disclosure. FIG. 26 is a perspective view of the example of the switch follower unit 8 included in the switch TS according to the embodiment of the present disclosure. In FIG. 22, some of the hidden components are indicated by broken lines. FIG. 24 is a bottom cross-sectional view of the switch TS as viewed from substantially the same viewpoint as FIG. 5 in the first embodiment. The internal structure of the switch TS will now be described in more detail with reference to FIGS. 21, 22, 23, 24, 25, and 26. A second half body 21 of the housing 2 has a space as a chamber 210 for accommodating the operation follower unit 7, the switch follower unit 8, and the holder 9. The chamber 210 is a rectangular box. The chamber 210 is hermetically sealed. The chamber 210 accommodates the holder 9 for holding components such as the operation follower unit 7 and the switch follower unit 8. The components such as the operation follower unit 7 and the switch follower unit 8 held by the holder 9 are hermetically sealed in the chamber 210 and are thus spaced from, for example, the operation-linked unit 4 and the switch-linked unit 5. The holder 9 includes a substrate 90 and a wall plate 91 joined together. The holder 9 includes a lower chamber 92 and an upper chamber 93. The lower chamber 92 accommodates the operation follower unit 7 in a manner movable back and forth. The upper chamber 93 accommodates the switch follower unit 8 in a manner movable back and forth.

The substrate 90 includes multiple thin plate-like fixed contacts 901 located to face the lower chamber 92 or the upper chamber 93. Two upper fixed contacts 901 aligned in the front-rear direction and two lower fixed contacts 901 aligned in the front-rear direction are attached to the lower chamber 92. In other words, four fixed contacts 901 aligned in the up-down direction and in the front-rear direction are attached to the lower chamber 92. Each fixed contact 901 is substantially rectangular. The lower rear fixed contact 901 is formed from a conductive material having lower conductivity than the conductive material for the other fixed contacts 901, and thus functions as a variable resistor having a resistance value that changes in accordance with a contact position. Three fixed contacts 901, which are each substantially rectangular, are aligned in the front-rear direction in the upper chamber 93.

The operation follower unit 7 includes a third magnet 70 and operation sliders 71 (sliders). The third magnet 70 is a substantially rectangular plate. Each operation slider 71 is a metal strip curved into a substantially bow shape. The third magnet 70 included in the operation follower unit 7 is located to have its magnetic poles positioned in the front-rear direction, for example, the north pole positioned frontward and the south pole positioned rearward. The operation follower unit 7 has recesses on its surface facing the substrate 90. The recesses receive the operation sliders 71. Each operation slider 71 in the operation follower unit 7 is a brush of a metal strip curved into a substantially bow shape. The operation slider 71 slides with its distal ends in contact with the fixed contact 901 on the substrate 90. The operation sliders 71 are aligned vertically and attached to the surface of the third magnet 70 facing the substrate 90.

The switch follower unit 8 includes a fourth magnet 80 and a switch slider 81. The fourth magnet 80 is a substantially rectangular plate. The switch slider 81 is a metal strip curved into a substantially bow shape. The fourth magnet 80 included in the switch follower unit 8 has a recess on its surface facing the substrate 90. The recess receives the switch slider 81. The switch slider 81 in the switch follower unit 8 is a brush of a metal strip curved into a substantially bow shape. The switch slider 81 slides with its distal ends in contact with the fixed contact 901 on the substrate 90. The switch slider 81 is attached to the surface of the fourth magnet 80 facing the substrate 90.

Operation

The operation of the switch TS will now be described.

Driving Operation

Figure 27:
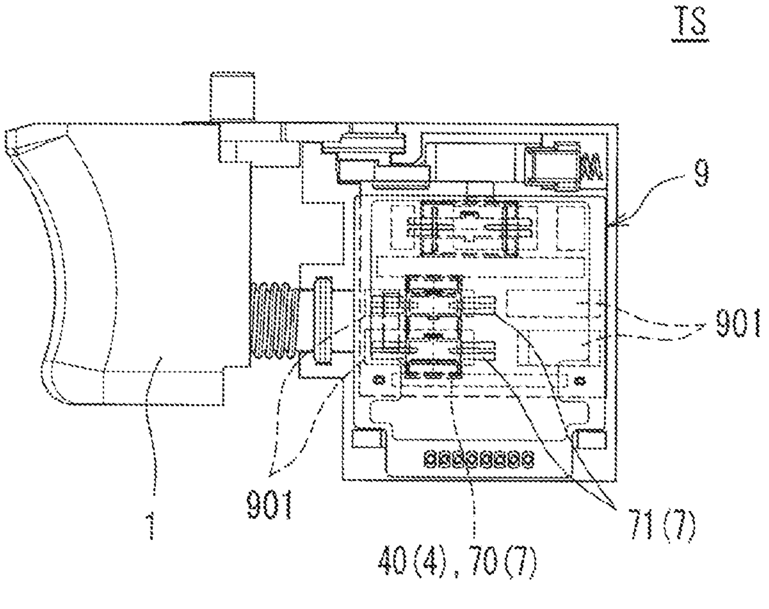
FIG. 27 is a diagram illustrating a side view of a switch according to one or more embodiments.
Figure 28:
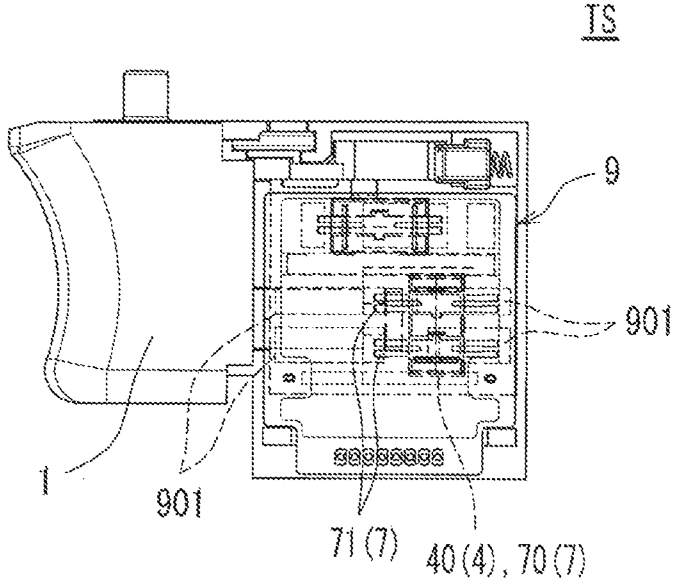
FIG. 28 is a diagram illustrating a side view of a switch according to one or more embodiments.

The operation of the switch TS in response to a depressing operation on the movable unit 1 will first be described. FIGS. 27 and 28 are side views of the switch TS according to the embodiment of the present disclosure. FIG. 27 does not show a first half body 20 and indicates some of the hidden components such as the fixed contacts 901 attached to the substrate 90 by broken lines to show the internal structure. In FIG. 27, the switch TS is not depressed on the movable unit 1. When the switch TS is not depressed, the movable unit 1 and a first magnet 40 in the operation-linked unit 4 are at the front ends of their movable ranges. With the first magnet 40 is at the front end of its movable range, the operation follower unit 7 is also at the front end of its movable range. The operation follower unit 7 and the first magnet 40, which attract each other with a magnetic force, are both at the front ends of their movable ranges. The operation follower unit 7 and the first magnet 40 thus overlap each other as viewed from the viewpoint in FIG. 27. The operation sliders 71 in the operation follower unit 7 at the front end of the movable range are in contact with the front fixed contacts 901 aligned vertically in the lower chamber 92 but are not in contact with the rear fixed contacts 901.

FIG. 28 shows the movable unit 1 in the state in FIG. 27 being depressed. In response to the depressing operation, the movable unit 1 moves backward, which is the depressing direction. The first magnet 40 in the operation-linked unit 4 moves backward as the movable unit 1 receiving the depressing operation moves. The operation follower unit 7 moves backward accordingly as the first magnet 40 moves. In the operation follower unit 7 moving backward, the front operation sliders 71 are in contact with the front fixed contacts 901 and the rear operation sliders 71 are in contact with the rear fixed contacts 901.

In a transmission mode in which the rotational speed of a drive unit M changes in accordance with the depressed amount of the movable unit 1, the drive unit M is driven in response to the lower rear operation slider 71 coming in contact with the lower rear fixed contact 901, and the rotational speed increases in accordance with the increase in the depressed amount. The lower rear fixed contact 901 functions as a variable resistor, thus allowing an operation detector TS1 to detect a resistance value to determine a depressed amount.

In a constant speed mode in which the rotational speed of the drive unit M is constant independently of the depressed amount of the movable unit 1, the drive unit M is driven in response to the upper rear operation slider 71 coming in contact with the upper rear fixed contact 901 and is controlled at a constant speed independently of the depressed amount.

Switching Operation

Figure 29:
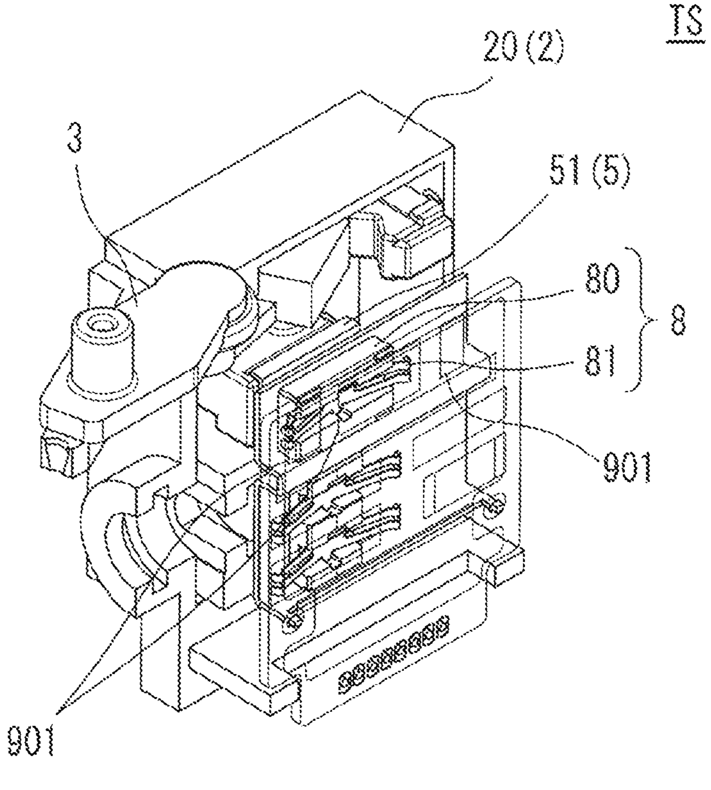
FIG. 29 is a diagram illustrating a perspective view of a switch according to one or more embodiments.
Figure 30:
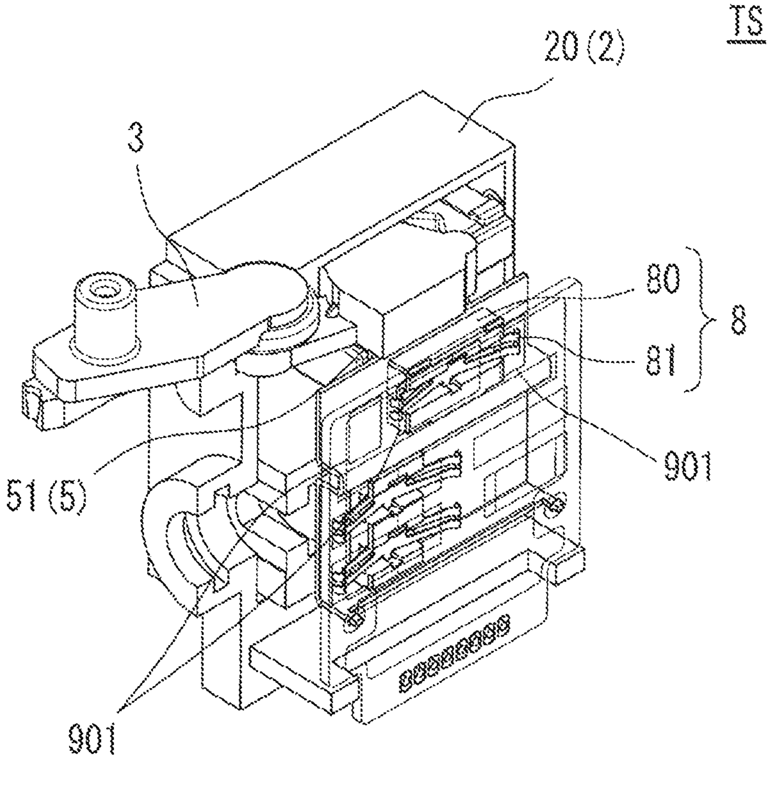
FIG. 30 is a diagram illustrating a perspective view of a switch according to one or more embodiments.

The operation of the switch TS in response to a switching operation on the switch lever 3 will now be described. FIGS. 29 and 30 are perspective views of the switch TS according to the embodiment of the present disclosure. FIGS. 29 and 30 do not show the movable unit 1 and the second half body 21 of the housing 2 and indicate some of the components as being transparent to show the internal structure. FIG. 29 shows the switch lever 3 swung counterclockwise as viewed in plan. The switch lever 3 swings counterclockwise, and the second magnet 51 is at the front end of its movable range. The switch follower unit 8 is thus also at the front end of its movable range. In the state shown in FIG. 29, the switch slider 81 in the switch follower unit 8 at the front end of its movable range is in contact with the front and central fixed contacts 901 in the upper chamber 93.

FIG. 30 shows the switch lever 3 swung clockwise as viewed in plan. The second magnet 51 is at the rear end of its movable range after moving in response to the switch lever 3 receiving the switching operation for swinging the switch lever 3 clockwise. The switch follower unit 8 is thus also at the rear end of its movable range. In the state shown in FIG. 30, the switch slider 81 in the switch follower unit 8 at the rear end of its movable range is in contact with the central and rear fixed contacts 901 in the upper chamber 93.

Electric Device

The structure of an electric device ET in the second embodiment is substantially the same as the electric device ET in the first embodiment. Thus, the electric device ET in the first embodiment described with reference to FIG. 18 will be referred to. However, the control method in the second embodiment differs from the control method in the first embodiment. In the second embodiment, the operation detector TS1 detects the depressed amount of the movable unit 1 based on the resistance between the two lower fixed contacts 901 attached to the lower chamber 92 on the substrate 90 in the transmission mode. In the constant speed mode, the operation detector TS1 detects a conductive state between the two upper fixed contacts 901 attached to the lower chamber 92 on the substrate 90.

In the second embodiment, a switch detector TS2 detects the angle of the switch lever 3 based on the conductive state between the three fixed contacts 901 attached to the upper chamber 93 on the substrate 90.

A controller TS0 in the switch TS receives a detection result of the depressing operation from the operation detector TS1 and a detection result of the switching operation from the switch detector TS2. The controller TS0 determines an output of the drive unit M, such as the rotational speed of the motor, based on the detection result from the operation detector TS1. The controller TS0 determines a driving mode of the drive unit M, such as a rotation mode of the motor, based on the detection result from the switch detector TS2. The controller TS0 in the switch TS outputs, from the output unit TS3 to a main unit MU, an electric signal for driving the drive unit M with the driving mode determined based on the detection result from the switch detector TS2 and with the output based on the detection result from the operation detector TS1. The main unit MU drives the drive unit M in response to the electric signal input from the switch TS.

As described above, the switch TS according to one or more embodiments of the present disclosure separates components that operate in response to an operation for driving or switching from components associated with an electrical system that detect an operation and drive the drive unit M. The components associated with the electrical system spaced from the components that operate in response to an operation for driving or switching follow the components that operate in response to an operation for driving or switching with a magnetic force. The above described structure can easily achieve airtightness, or for example, can be waterproof or dustproof, and have higher airtightness. In particular, the components associated with the electrical system to detect an operation and drive the drive unit M are accommodated in the chamber 210 and are sealed hermetically to increase airtightness.

The components associated with the electrical system are accommodated in the chamber 210 and hermetically sealed, and are thus spaced from components that can easily lower airtightness, including components that change the inner volume of the housing 2, such as the movable unit 1, and components that extend, in operation, through the housing 2, such as the switch lever 3. The above-described structure can, for example, constantly maintain airtightness or have other advantageous effects, unlike, for example, a switch using a rubber gasket.

One or more embodiments is not limited to the above embodiments and may be modified in various manners. The above embodiments are mere examples and may not limit the disclosure. The technical scope is defined not by the description given above but by the claims. Any modifications and alterations contained in the equivalency range of the claims fall within the scope.

For example, although the operation-linked unit 4 and the operation follower unit 7 are both magnetic in the above embodiments, the present invention is not limited to the embodiments. For the operation-linked unit 4 and the operation follower unit 7 that follows the operation-linked unit 4, either of the operation-linked unit 4 or the operation follower unit 7 may be magnetic. The same applies to the switch-linked unit 5 and the switch follower unit 8.

For example, although the operation follower unit 7 and the switch follower unit 8 are formed from a magnetic and dielectric plastic magnetic material in the above embodiments, the present invention is not limited to the embodiments. The operation follower unit 7 and the switch follower unit 8 may be formed from any magnetic and dielectric material. For example, one or more embodiments may be variously modified to have, for example, the operation follower unit 7 and the switch follower unit 8 that are plate-like permanent magnets attached to resin plates.

For example, although the operation follower unit 7 and the switch follower unit 8 are formed using dielectrics to detect an operation contactlessly based on the capacitance in the above embodiments, the present invention is not limited to the embodiments. For example, the substrate 90 to which a magnetic sensor such as a Hall integrated circuit or an induction coil is attached may detect the movements of the magnetic operation follower unit 7 and the magnetic switch follower unit 8 contactlessly with the magnetic sensor. One or more embodiments may be variously modified to detect the movements of the magnetic operation follower unit 7 and the magnetic switch follower unit 8 contactlessly with, for example, an optical system such as a photoelectric sensor or an optical sensor.

For example, although the switch lever 3 is used to switch the driving mode by switching the rotational direction of the motor being the drive unit M between the forward rotation and the reverse rotation in the above embodiments, the present invention is not limited to the embodiments. The switch lever 3 may be used to switch any other driving mode. For example, one or more embodiments may be variously modified to include, for example, the switch lever 3 in the switch TS that switches between the transmission mode in which the output changes in accordance with the depressed amount of the movable unit 1 and the constant speed mode in which the output is constant independently of the depressed amount of the movable unit 1.

For example, although the operation detector TS1, the switch detector TS2, the controller TS0, and the output unit TS3 are located in the switch TS in the above embodiments, the present invention is not limited to the embodiments. The controller TS0 may be external to the housing 2 of the switch TS, or may be, for example, in the main unit MU.

For example, although one or more embodiments is applied to a trigger switch including a trigger in the above embodiments, the present invention is not limited to the embodiments. Any switch TS may include the movable unit 1 that moves in response to an operation. For example, one or more embodiments may be modified to be applicable to, for example, a push button switch including a push button as the movable unit 1. The switch TS according to one or more embodiments may be incorporated into not only a power tool but also other types of electric devices ET.

The invention claimed is:

1. A switch for driving a drive unit, the switch comprising:

a movable unit movable in response to an operation, the drive unit being drivable in response to movement of the movable unit;

an operation-linked unit movable in response to the movement of the movable unit receiving the operation; and an operation follower unit spaced from the operation-linked unit, the operation follower unit being movable in response to movement of the operation-linked unit with a magnetic force between the operation follower unit and the operation-linked unit, the magnetic force causing the operation follower unit and the operation-linked unit to attract each other, wherein at least one of the operation-linked unit or the operation follower unit is magnetic, and the drive unit is drivable in response to movement of the operation follower unit, which causes a change in a capacitance that determines an output of the drive unit.

2. The switch according to claim 1, further comprising:

a chamber accommodating the operation follower unit, wherein the operation follower unit accommodated in the chamber is spaced from the operation-linked unit.

3. The switch according to claim 1, wherein the drive unit is drivable based on a result of detecting the movement of the operation follower unit contactlessly.

4. The switch according to claim 1, further comprising:

an electrode adjacent to a movable range of the operation follower unit, wherein the operation follower unit is dielectric, and the drive unit is drivable based on a result of detecting the movement of the operation follower unit contactlessly as the change in the capacitance of a capacitor formed with the operation follower unit and the electrode.

5. The switch according to claim 1, further comprising:

a fixed contact, wherein the operation follower unit comprises a slider slidable on the fixed contact in response to the movement of the operation follower unit, and the drive unit is drivable based on a result of detecting the movement of the operation follower unit as a change in a conductive state or an electric resistance value of the fixed contact.

6. The switch according to claim 1, further comprising:

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, wherein at least one of the switch-linked unit or the switch follower unit is magnetic, and the driving mode of the drive unit is switchable in response to movement of the switch follower unit.

7. The switch according to claim 1, wherein the switch is incorporated into an electric device comprising the drive unit drivable in response to an electric signal, and the switch further comprises:

an output unit configured to output the electric signal to drive the drive unit, the output unit being configured to output the electric signal to drive the drive unit.

8. The switch according to claim 2, wherein the drive unit is drivable based on a result of detecting the movement of the operation follower unit contactlessly.

9. The switch according to claim 2, further comprising:

an electrode adjacent to a movable range of the operation follower unit, wherein the operation follower unit is dielectric, and the drive unit is drivable based on a result of detecting the movement of the operation follower unit contactlessly as the change in the capacitance of a capacitor formed with the operation follower unit and the electrode.

10. The switch according to claim 2, further comprising:

a fixed contact, wherein the operation follower unit comprises a slider slidable on the fixed contact in response to the movement of the operation follower unit, and the drive unit is drivable based on a result of detecting the movement of the operation follower unit as a change in a conductive state or an electric resistance value of the fixed contact.

11. The switch according to claim 2, further comprising:

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, wherein at least one of the switch-linked unit or the switch follower unit is magnetic, and the driving mode of the drive unit is switchable in response to movement of the switch follower unit.

12. The switch according to claim 3, further comprising:

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, wherein at least one of the switch-linked unit or the switch follower unit is magnetic, and the driving mode of the drive unit is switchable in response to movement of the switch follower unit.

13. The switch according to claim 4, further comprising:

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, wherein at least one of the switch-linked unit or the switch follower unit is magnetic, and the driving mode of the drive unit is switchable in response to movement of the switch follower unit.

14. The switch according to claim 5, further comprising:

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, wherein at least one of the switch-linked unit or the switch follower unit is magnetic, and the driving mode of the drive unit is switchable in response to movement of the switch follower unit.

15. The switch according to claim 2, wherein the switch is incorporated into an electric device comprising the drive unit drivable in response to an electric signal, and the switch further comprises:

an output unit configured to output the electric signal to drive the drive unit, the output unit being configured to output the electric signal to drive the drive unit.

16. The switch according to claim 3, wherein the switch is incorporated into an electric device comprising the drive unit drivable in response to an electric signal, and the switch further comprises:

an output unit configured to output the electric signal to drive the drive unit, the output unit being configured to output the electric signal to drive the drive unit.

17. The switch according to claim 4, wherein the switch is incorporated into an electric device comprising the drive unit drivable in response to an electric signal, and the switch further comprises:

an output unit configured to output the electric signal to drive the drive unit, the output unit being configured to output the electric signal to drive the drive unit.

18. The switch according to claim 5, wherein the switch is incorporated into an electric device comprising the drive unit drivable in response to an electric signal, and the switch further comprises:

an output unit configured to output the electric signal to drive the drive unit, the output unit being configured to output the electric signal to drive the drive unit.

19. A switch for driving a drive unit, the switch comprising:

a movable unit movable in response to an operation, the drive unit being drivable in response to movement of the movable unit;

a switch member operable in response to a switching operation to switch a driving mode of the drive unit;

a switch-linked unit movable in response to an operation of the switch member receiving the switching operation; and a switch follower unit spaced from the switch-linked unit, the switch follower unit being movable in response to movement of the switch-linked unit with a magnetic force between the switch follower unit and the switch-linked unit, the magnetic force causing the switch follower unit and the switched-linked unit to attract each other, wherein at least one of the switch-linked unit or the switch follower unit is magnetic, and the driving mode of the drive unit is switchable in response to movement of the switch follower unit, which causes a change in a capacitance that determines the driving mode of the drive unit.

20. The switch according to claim 19, further comprising:

a chamber accommodating the switch follower unit, wherein the switch follower unit accommodated in the chamber is spaced from the switch-linked unit.

* * * * *